US012749351B2

(12) United States Patent
Sawada et al.

(10) Patent No.: US 12,749,351 B2
(45) **Date of Patent: *Sep. 29, 2026**

(54) INFORMATION PRESENTATION DEVICE

(71) Applicant: SUBARU CORPORATION, Tokyo (JP)

(72) Inventors: Naomichi Sawada, Tokyo (JP); Kazuto Hanawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,067

(22) Filed: Dec. 12, 2024

(65) Prior Publication Data

US 2025/0111710 A1 Apr. 3, 2025

Related U.S. Application Data

(63) Continuation of application No. PCT/JP2023/011116, filed on Mar. 22, 2023.

(51) Int. Cl.
*G07C 5/02* (2006.01)
*G10K 15/02* (2006.01)
(Continued)

(52) U.S. Cl.
CPC ............... *G07C 5/02* (2013.01); *G10K 15/02* (2013.01); *H04R 3/04* (2013.01); *H04R 3/12* (2013.01); *H04R 5/02* (2013.01); *H04R 2499/13* (2013.01)

(58) Field of Classification Search
CPC . G07C 5/02; G10K 15/02; H04R 3/04; H04R 3/12; H04R 5/02; B60R 11/02
(Continued)

(56) References Cited

U.S. PATENT DOCUMENTS 10,049,654 B1 * 8/2018 Wheeler ................ G10K 15/02
10,499,180 B1 * 12/2019 Harper ..................... H04R 5/02
(Continued)

FOREIGN PATENT DOCUMENTS

JP H06109066 A * 4/1994
JP H06-92159 A 11/1994
(Continued)

OTHER PUBLICATIONS

Praźnowski, K.; Mamala, J.; Deptuła, A.; Deptuła, A.M.; Bieniek, A. Diagnosis of the Pneumatic Wheel Condition Based on Vibration Analysis of the Sprung Mass in the Vehicle Self-Diagnostics System. Sensors 2023, 23, 2326. https://doi.org/10.3390/s23042326 (Year: 2023).*
(Continued)

*Primary Examiner* — Abby J Flynn
*Assistant Examiner* — Merritt Levy
(74) *Attorney, Agent, or Firm* — Rimon P.C.

(57) ABSTRACT

An information presentation device includes one or more speakers, one or more acceleration detectors, and a processor. The one or more speakers are configured to present an occupant of a vehicle with audio information. The one or more acceleration detectors are configured to respectively output one or more acceleration signals respectively indicating longitudinal acceleration rates of one or more unsprung components that make relative displacements to a vehicle body of the vehicle in accordance with respective strokes of one or more suspensions that respectively support one or more wheels of the vehicle. The processor is configured to perform filter processing with a predetermined frequency band on the one or more acceleration signals and output one or more resultant signals as one or more driving signals respectively to the one or more speakers.

7 Claims, 2 Drawing Sheets

(51) Int. Cl.
*H04R 3/04* (2006.01)
*H04R 3/12* (2006.01)
*H04R 5/02* (2006.01)

(58) Field of Classification Search
USPC .......................................................... 701/34.4
See application file for complete search history.

(56) References Cited

U.S. PATENT DOCUMENTS

| | | | | |
|---|---|---|---|---|
| 2005/0236210 | A1* | 10/2005 | Kawazoe | B62D 15/029 180/272 |
| 2010/0063678 | A1 | 3/2010 | Yamamoto | |
| 2017/0282790 | A1 | 10/2017 | Pan | |
| 2018/0332386 | A1* | 11/2018 | Toda | H04S 7/302 |
| 2021/0297769 | A1 | 9/2021 | Brummer et al. | |
| 2021/0323562 | A1* | 10/2021 | You | B60W 50/0205 |
| 2022/0101752 | A1 | 3/2022 | Sumikawa et al. | |
| 2022/0319491 | A1* | 10/2022 | Hattori | B60Q 9/00 |
| 2023/0100827 | A1* | 3/2023 | Zhou | B60W 40/06 701/26 |
| 2023/0197055 | A1* | 6/2023 | Oh | G10K 11/17881 381/71.4 |

FOREIGN PATENT DOCUMENTS

| | | | |
|---|---|---|---|
| JP | H06-332469 | A | 12/1994 |
| JP | 2001-165711 | A | 6/2001 |
| JP | 2006-131136 | A | 5/2006 |
| JP | 2010-64590 | A | 3/2010 |
| JP | 2011-121506 | A | 6/2011 |
| JP | 2012-141244 | A | 7/2012 |
| JP | 2021-528887 | A | 10/2021 |
| JP | 2022-54982 | A | 4/2022 |

OTHER PUBLICATIONS

International Search Report (with English translation) and Written Opinion dated Jun. 20, 2023, from corresponding International Application No. PCT/JP2023/011116, 9 pages.
International Search Report (with English translation) and Written Opinion dated Jun. 20, 2023, from corresponding International Application No. PCT/JP2023/011118, 8 pages.
Non-Final Office Action dated Feb. 25, 2026, issued in related U.S. Appl. No. 18/978,086.
Office Action issued in corresponding Japanese Application No. 2025-507996, dated Jul. 28, 2026.

* cited by examiner

INFORMATION PRESENTATION DEVICE

CROSS-REFERENCE TO RELATED APPLICATIONS

This application is continuation of International Application No. PCT/JP2023/011116, filed on Mar. 22, 2023, the entire contents of which are hereby incorporated by reference.

BACKGROUND

The disclosure relates to an information presentation device configured to present an occupant of a vehicle with audio information.

As a technique related to use of audio information for an occupant of a vehicle such as an automobile, for example, Japanese Unexamined Patent Application Publication (JP-A) No. H06-332469 describes an active muffling device for a vehicle. The active muffling device detects vibration while traveling by an acceleration rate sensor, and adds detected signals by an addition circuit to generate a reference signal. The reference signal is supplied to a microprocessor, subjected to adaptive signal processing, and thereafter, outputted as an output control signal in the form of a secondary sound from a speaker to muffle road noises.

As a technique related to attachment of an acceleration rate sensor to an unsprung component of a suspension of a vehicle, JP-A No. 2010-64590 describes a sensor system for a motion control. The sensor system makes a travel stability control in cornering of a moving body. In the sensor system, an acceleration rate sensor is attached to a knuckle rigidly coupled to a lower portion of a shock absorber or to lower side of the shock absorber. Furthermore, an acceleration rate sensor head includes any one of acceleration rate sensors that detect a lateral acceleration rate, a longitudinal acceleration rate, and a vertical acceleration rate, or any combination thereof.

SUMMARY

An aspect of the disclosure provides an information presentation device including one or more speakers, one or more acceleration detectors, and a processor. The one or more speakers are configured to present an occupant of a vehicle with audio information. The one or more acceleration detectors are configured to respectively output one or more acceleration signals respectively indicating longitudinal acceleration rates of one or more unsprung components that make relative displacements to a vehicle body of the vehicle in accordance with respective strokes of one or more suspensions that respectively support one or more wheels of the vehicle. The processor is configured to perform filter processing with a predetermined frequency band on the one or more acceleration signals and output one or more resultant signals as one or more driving signals respectively to the one or more speakers.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
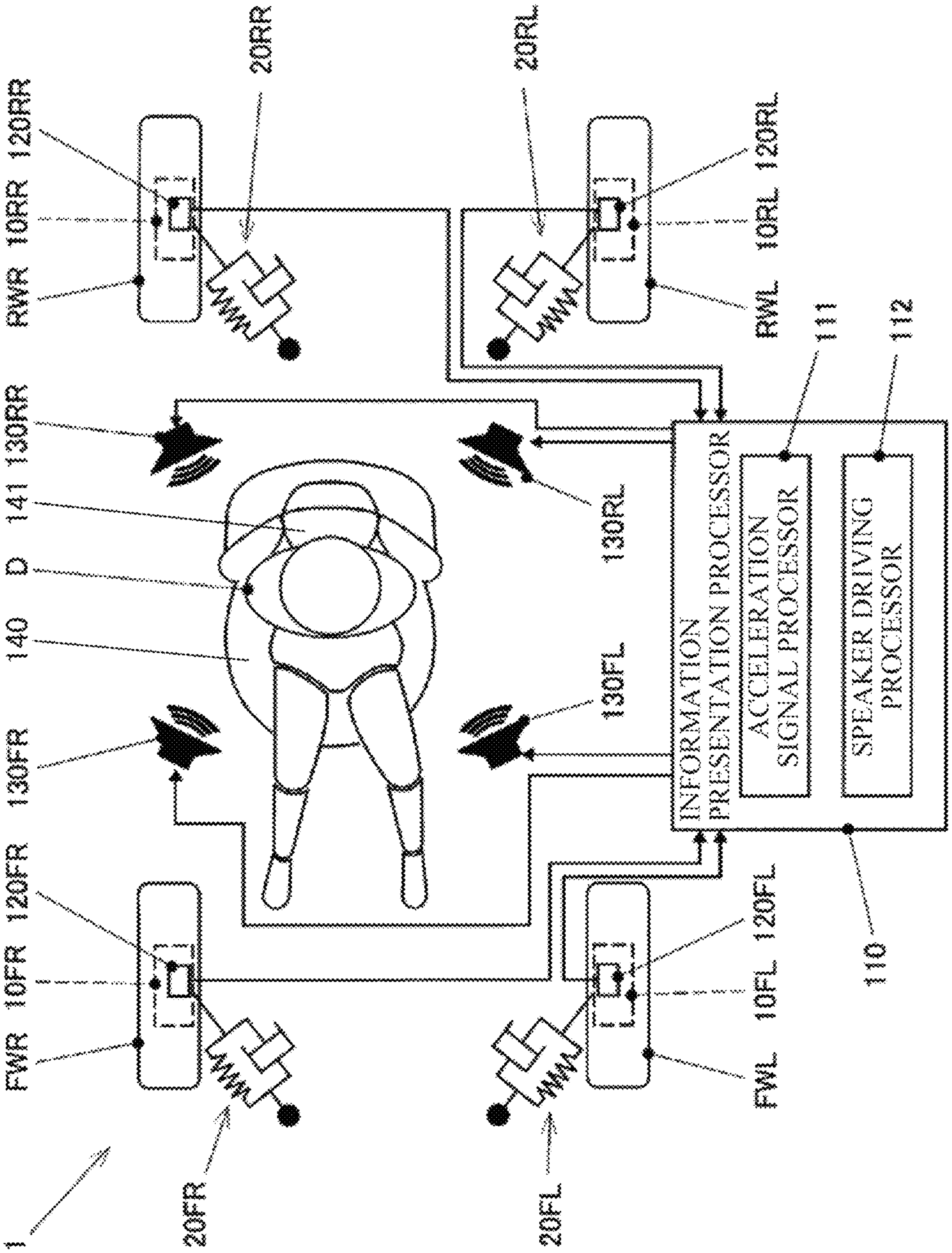
FIG. 1 is a schematic diagram of a configuration of a vehicle on which an information presentation device according to an embodiment of the disclosure is provided.

A driver of a vehicle such as an automobile grasps a road surface state and the sense of grip of tires by vibration or sounds inputted from a road surface. The sense of grip of the tires is the feeling about a degree of margin of a tire-generated force.

However, in recent years, by electrification of power units and adoption of steer-by-wire steering devices, there is tendency of a decrease in information the driver obtains from a vehicle as sounds or vibration.

Lack of such information causes difficulties in grasping the road surface state and vehicle behavior, resulting in a concern about lowered controllability of acceleration and deceleration.

To address this, making it possible to present the driver with information related to longitudinal behavior of unsprung components such as the tires makes it easier for the driver to perceive the sense of longitudinal grip of the tires, leading to enhancement in the controllability of acceleration and deceleration.

It is desirable to provide an information presentation device that makes it possible to appropriately present an occupant of a vehicle with information regarding a state of contact between a road surface and tires.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

An information presentation device according to an embodiment of the disclosure may be provided in, for example, an automobile such as a passenger car. The information presentation device according to the embodiment is configured to present, by audio information, an occupant with information regarding a state of contact between a road surface and tires, in particular, information regarding tire-generated longitudinal forces. The occupant may be, for example, a driver D.

FIG. 1 schematically illustrates a configuration of a vehicle on which the information presentation device according to the embodiment is provided.

A vehicle 1 may include a four-wheel vehicle including a right front wheel FWR, a left front wheel FWL, a right rear wheel RWR, and a left rear wheel RWL.

The right front wheel FWR may be attached to a right front housing 10FR.

The left front wheel FWL may be attached to a left front housing 10FL.

The right rear wheel RWR may be attached to a right rear housing 10RR.

The left rear wheel RWL may be attached to a left rear housing 10RL.

The housings may accommodate respective hub bearings that rotatably support the respective wheels.

The housings are unsprung components that are provided wheelward of suspension springs and make relative displacements to a vehicle body together with the wheels, or the tires, in accordance with strokes of suspensions.

The right front housing 10FR may be attached to the vehicle body, with a right front suspension 20FR in between.

The left front housing 10FL may be attached to the vehicle body, with a left front suspension 20FL in between.

The right rear housing 10RR may be attached to the vehicle body, with a right rear suspension 20RR in between.

The left rear housing 10RL may be attached to the vehicle body, with a left rear suspension 20RL in between.

The suspensions may each include the suspension spring and a damper. The suspension spring may generate a spring reaction force in accordance with the stroke. The damper may generate a damping force in accordance with a speed of the stroke.

An information presentation device according to the embodiment is configured to present the driver D accommodated in a cabin with information regarding the state of contact between the road surface and the tires of the right front wheel FWR, the left front wheel FWL, the right rear wheel RWR, and the left rear wheel RWL, in particular, the tire-generated longitudinal forces, as the audio information.

The information presentation device may include, without limitation, an information presentation processor 110, a right front acceleration sensor 120FR, a left front acceleration sensor 120FL, a right rear acceleration sensor 120RR, a left rear acceleration sensor 120RL, a right front speaker 130FR, a left front speaker 130FL, a right rear speaker 130RR, and a left rear speaker 130RL.

The information presentation processor 110 is configured to generate driving signals for the respective speakers in accordance with acceleration signals outputted by the right front acceleration sensor 120FR, the left front acceleration sensor 120FL, the right rear acceleration sensor 120RR, and the left rear acceleration sensor 120RL, and output the driving signals to the right front speaker 130FR, the left front speaker 130FL, the right rear speaker 130RR, and the left rear speaker 130RL.

A configuration and operation of the information presentation processor 110 are described later in detail.

The right front acceleration sensor 120FR may be attached to the right front housing 10FR.

The left front acceleration sensor 120FL may be attached to the left front housing 10FL.

The right rear acceleration sensor 120RR may be attached to the right rear housing 10RR.

The left rear acceleration sensor 120RL may be attached to the left rear housing 10RL.

The right front acceleration sensor 120FR, the left front acceleration sensor 120FL, the right rear acceleration sensor 120RR, and the left rear acceleration sensor 120RL are configured to detect longitudinal acceleration rates of the housings to which they are attached, and output output-signals, i.e., the acceleration signals, in accordance with the acceleration rates. The longitudinal acceleration rates of the housings are acceleration rates in directions of axles of the respective wheels.

The output-signals outputted by the respective acceleration sensors may be transmitted to the information presentation processor 110.

The right front speaker 130FR, the left front speaker 130FL, the right rear speaker 130RR, and the left rear speaker 130RL are configured to vibrate the air around the ears, or the head, of the driver D, i.e., the air around a headrest 141 of a driver's seat 140, and present the driver D with the audio information.

The right front speaker 130FR may be disposed right frontward of the ear of the driver D, i.e., right frontward of the headrest 141 of the driver's seat 140.

The left front speaker 130FL may be disposed left frontward of the ear of the driver D, i.e., left frontward of the headrest 141 of the driver's seat 140.

The right rear speaker 130RR may be disposed right rearward of the ear of the driver D, i.e., right rearward of the headrest 141 of the driver's seat 140.

The left rear speaker 130RL may be disposed left rearward of the ear of the driver D, i.e., left rearward of the headrest 141 of the driver's seat 140.

When the vehicle includes an infotainment system, an audio system, or the like that play back music, etc., speakers used in the infotainment system, the audio system, or the like may serve as the right front speaker 130FR, the left front speaker 130FL, the right rear speaker 130RR, and the left rear speaker 130RL.

The information presentation processor 110 may include, for example, an acceleration signal processor 111 and a speaker driving processor 112.

The acceleration signal processor 111 may perform predetermined signal processing on the acceleration signals outputted by the right front acceleration sensor 120FR, the left front acceleration sensor 120FL, the right rear acceleration sensor 120RR, and the left rear acceleration sensor 120RL.

The acceleration signal processor 111 may include a filter such as a band-pass filter configured to relatively emphasize a predetermined frequency band in the acceleration signals over other frequency bands, or reduce other frequency bands.

The signal processing such as filter processing in the acceleration signal processor 111 may be independently performed on the acceleration signals outputted by the right front acceleration sensor 120FR, the left front acceleration sensor 120FL, the right rear acceleration sensor 120RR, and the left rear acceleration sensor 120RL.

The speaker driving processor 112 may amplify the acceleration signals after the filter processing by the acceleration signal processor 111 with a predetermined output gain, and output the driving signals for the right front speaker 130FR, the left front speaker 130FL, the right rear speaker 130RR, and the left rear speaker 130RL.

The speaker driving processor 112 may convert the acceleration signals into audio signals in cooperation with each speaker.

The driving signal for the right front speaker 130FR may be generated using the acceleration signal acquired by the right front acceleration sensor 120FR.

The driving signal for the left front speaker 130FL may be generated using the acceleration signal acquired by the left front acceleration sensor 120FL.

The driving signal for the right rear speaker 130RR may be generated using the acceleration signal acquired by the right rear acceleration sensor 120RR.

The driving signal for the left rear speaker 130RL may be generated using the acceleration signal acquired by the left rear acceleration sensor 120RL.

Figure 2:
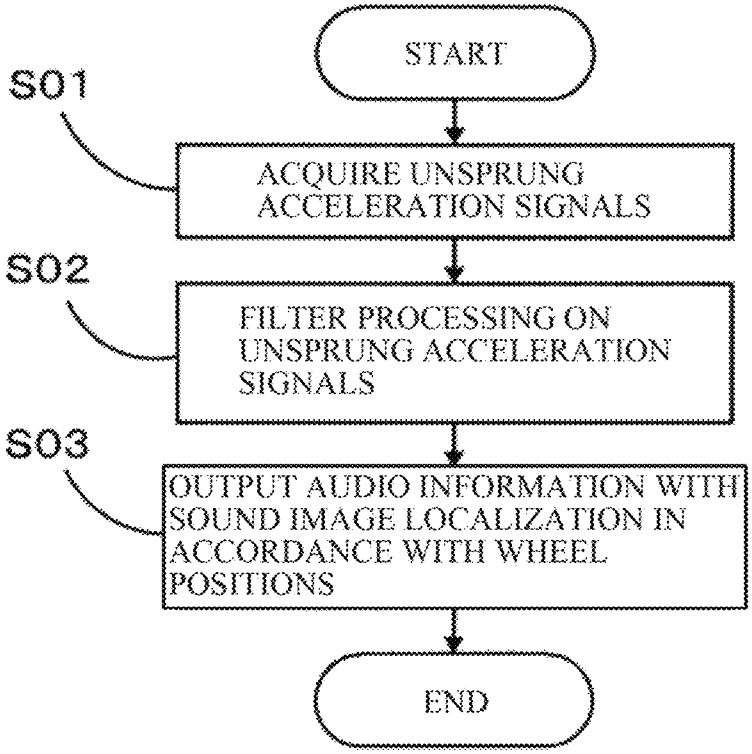
FIG. 2 is a flowchart of operation of the information presentation device according to the embodiment.

FIG. 2 is a flowchart of operation of the information presentation device according to the embodiment.

In the following, the steps are described in order.

<Step S01: Acquire Unsprung Acceleration Signals>

The information presentation processor 110 may acquire unsprung longitudinal acceleration signals outputted by the right front acceleration sensor 120FR, the left front acceleration sensor 120FL, the right rear acceleration sensor 120RR, and the left rear acceleration sensor 120RL.

Thereafter, the flow may proceed to step S02.

<Step S02: Filter Processing on Unsprung Acceleration Signals>

The acceleration signal processor 111 of the information presentation processor 110 may perform the filter processing to emphasize a frequency band including a natural frequency of tortional vibration of the tires of the respective wheels, on the acceleration signals acquired in step S01.

For example, as to tires for a passenger car, the acceleration signal processor 111 may be configured to perform band-pass filter processing to emphasize a frequency band including a part or all of a range of 30 Hz to 40 Hz, both inclusive, over other frequency bands.

Moreover, the acceleration signal processor 111 may perform filter processing of reducing a frequency band including a natural frequency of vibration of a driving system, with respect to other frequency bands. Such vibration of the driving system constitutes a hindrance to transmission of the sense of longitudinal grip of the tires to the driver D.

The acceleration signal processor 111 may be configured to perform low-pass filter processing of reducing a frequency band of, for example, 100 Hz or higher, with respect to other frequency bands.

Thereafter, the flow may proceed to step S03.

<Step S03: Output Audio Information with Sound Image Localization in Accordance with Wheel Positions>

The speaker driving processor 112 of the information presentation processor 110 may output the driving signals for the right front speaker 130FR, the left front speaker 130FL, the right rear speaker 130RR, and the left rear speaker 130RL in accordance with the acceleration signals subjected to the filter processing in step S02.

At this occasion, the speaker driving processor 112 may present the driver D with the audio signals based on the acceleration signals acquired from the acceleration sensors of the respective wheels, with sound image localization that differs with the positions of the respective wheels. The sound image localization is positions of sound sources to be recognized by the driver D.

In one example, directions in the sound image localization as viewed from the driver D may be close to directions of the respective wheels as viewed from the driver D, i.e., directions of the respective wheels with respect to the headrest 141 of the driver's seat 140. For example, the directions in the sound image localization as viewed from the driver D may coincide with the directions of the respective wheels.

In one example, the audio information based on the acceleration signal acquired by the right front acceleration sensor 120FR may be outputted by the right front speaker 130FR to be heard from right frontward of the driver D, i.e., right frontward of the headrest 141 of the driver's seat 140.

The audio information based on the acceleration signal acquired by the left front acceleration sensor 120FL may be outputted by the left front speaker 130FL to be heard from left frontward of the driver D, i.e., left frontward of the headrest 141 of the driver's seat 140.

The audio information based on the acceleration signal acquired by the right rear acceleration sensor 120RR may be outputted by the right rear speaker 130RR to be heard from right rearward of the driver D, i.e., right rearward of the headrest 141 of the driver's seat 140.

The audio information based on the acceleration signal acquired by the left rear acceleration sensor 120RL may be outputted by the left rear speaker 130RL to be heard from left rearward of the driver D, i.e., left rearward of the headrest 141 of the driver's seat 140.

Thereafter, the series of processes may be ended and the flow may return.

According to the embodiment described above, it is possible to obtain the following effects.

(1) By presenting the driver D with the audio information in accordance with the acceleration signals indicating the longitudinal acceleration rates of the right front housing 10FR, the left front housing 10FL, the right rear housing 10RR, and the left rear housing 10RL as the unsprung components of the suspensions, it is possible to appropriately present the driver D with the state of contact between the road surface and the tires, in particular, a state of generation of tire-generated longitudinal forces. Hence, it is possible to allow the driver D to satisfactorily perceive the sense of longitudinal grip of the tires, leading to enhancement in controllability of acceleration and deceleration.

Moreover, by performing the information presentation by the audio information, it is possible to prevent influences of, for example, a thickness of clothing as in a case where the information presentation is performed by vibration of the seat.

(2) The vehicle 1 may include a four-wheel vehicle including the right front wheel FWR, the left front wheel FWL, the right rear wheel RWR, the left rear wheel RWL. The right front acceleration sensor 120FR, the left front acceleration sensor 120FL, the right rear acceleration sensor 120RR, and the left rear acceleration sensor 120RL may output the acceleration signals indicating the longitudinal acceleration rates of the right front housing 10FR provided on the right front wheel FWR, the left front housing 10FL provided on the left front wheel FWL, the right rear housing 10RR provided on the right rear wheel RWR, and the left rear housing 10RL provided on the left rear wheel RWL. The right front speaker 130FR, the left front speaker 130FL, the right rear speaker 130RR, and the left rear speaker 130RL are configured to present the driver D with the audio information in accordance with the acceleration signals indicating the longitudinal acceleration rates of the right front housing 10FR, the left front housing 10FL, the right rear housing 10RR, and the left rear housing 10RL, with the sound image localization right frontward, left frontward, right rearward, and left rearward of the driver D, i.e., the headrest 141 of the driver's seat 140. Thus, presenting the information regarding the wheels in the four-wheel vehicle as the audio information with the sound image localization located on the four sides of the occupant, i.e., on the four sides of the headrest 141 of the driver's seat 140, makes it possible to allow the occupant to intuitively grasp the positions of the wheels as the information sources.

(3) By emphasizing the predetermined frequency band highly correlated with the state of contact between the road surface and the tires over other frequency bands, it is possible to promote the effects described above. The predetermined frequency band may be, for example, the frequency band of 30 Hz to 40 Hz, both inclusive, including the natural frequency of the torsional vibration of the tires.

(4) By reducing the frequency band including the natural frequency of the vibration of the driving system of the vehicle, e.g., 100 Hz or higher, with respect to other frequency bands, it is possible to prevent the vibration of the driving system from inhibiting the transmission of the sense of longitudinal grip of the tires to the driver. Hence, it is possible to allow the driver to perceive the sense of longitudinal grip of the tires more satisfactorily.

<Modification Examples>

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the information presentation device and the vehicle are not limited to the configurations of the forgoing embodiment, but may be changed as appropriate.

(2) In the embodiment, the acceleration sensors are attached to the housings that accommodate the hub bearings. However, the acceleration sensors may be attached to other positions insofar as the acceleration sensors are attached to unsprung portions of the suspensions, that is, portions that make relative displacements to the vehicle body.

For example, the acceleration sensors may be attached to suspension arms, or links, unsprung portions of shock absorbers, a brake device, an inside of each tire, the wheels, or the like.

(3) In the embodiment, the audio information based on the acceleration signals acquired by the right front, left front, right rear, and left rear acceleration sensors are outputted from the right front, left front, right rear, and left rear speakers in one-to-one corresponding relation to the acceleration sensors. However, the acceleration sensors and the speakers do not have to be in the one-to-one corresponding relation. For example, the audio information based on an output of a single acceleration sensor may be outputted from multiple speakers. Moreover, the audio information based on outputs of multiple acceleration sensors may be outputted from a common speaker. In this case, the sound image localization of the audio information based on the outputs of the respective acceleration sensors may be set by, for example, a volume balance between the speakers, frequency characteristics of each speaker, and phase differences between the speakers.

(4) In the embodiment, the acceleration rates of the housings of all the four wheels are detected and the acceleration signals are presented as the audio signals. However, the disclosure is not limited thereto. The acceleration signals of the unsprung components of some of the wheels, whether one wheel or multiple wheels, may be presented as the audio information. In this case, when presenting the acceleration signals of the unsprung components of the multiple wheels, the sound image localization of the audio information may differ in accordance with the positions of the wheels.

The information presentation processor 110 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the information presentation processor 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the information presentation processor 110 illustrated in FIG. 1.

The invention claimed is:

1. An information presentation device comprising:

one or more speakers configured to present audio information regarding a state of contact between a road surface and one or more tires of a vehicle to an occupant of the vehicle;

one or more acceleration detectors configured to output one or more acceleration signals indicating acceleration rates in a front-rear direction of one or more unsprung components, the one or more unsprung components being displaced relative to a vehicle body of the vehicle in accordance with strokes of one or more suspensions that support one or more wheels of the vehicle; and a processor configured to:

perform filter processing on the one or more acceleration signals such that a component of a predetermined frequency band correlated with the state of contact between the road surface and the one or more tires is emphasized over components of other frequency bands;

generate the audio information from the one or more acceleration signals subjected to the filter processing; and output one or more resultant signals as one or more driving signals to the one or more speakers.

2. The information presentation device according to claim 1, wherein the one or more wheels comprise a plurality of wheels, the one or more speakers comprise a plurality of speakers, the one or more unsprung components comprise a plurality of unsprung components, the one or more acceleration signals comprise a plurality of acceleration signals, the one or more acceleration detectors are configured to respectively output the acceleration signals indicating the acceleration rates of the unsprung components provided on the wheels respectively, and the speakers are configured to present the occupant of the vehicle with the audio information based on the acceleration signals of the unsprung components, with sound image localization that differs with positions of the wheels on which the unsprung components are provided.

3. The information presentation device according to claim 2, wherein the processor comprises an acceleration signal processor configured to perform the filter processing and generate the audio information from the one or more acceleration signals subjected to the filter processing.

4. The information presentation device according to claim 3, wherein the predetermined frequency band includes a natural frequency of torsional vibration of one or more tires of the vehicle.

5. The information presentation device according to claim 1, wherein the vehicle comprises a four-wheel vehicle with a right front wheel, a left front wheel, a right rear wheel, and a left rear wheel, the one or more acceleration detectors are configured to respectively output the one or more acceleration signals indicating the acceleration rates of the one or more unsprung components provided on the right front wheel, the left front wheel, the right rear wheel, and the left rear wheel, the one or more speakers comprise a plurality of speakers, and the speakers are configured to present the occupant of the vehicle with the audio information based on the one or more acceleration signals of the one or more unsprung components provided on the right front wheel, the left front wheel, the right rear wheel, and the left rear wheel, with sound image localization respectively right frontward, left frontward, right rearward, and left rearward of a headrest of a driver's seat of the vehicle.

6. The information presentation device according to claim 1, wherein the processor comprises an acceleration signal processor configured to perform the filter processing and generate the audio information from the one or more acceleration signals subjected to the filter processing.

7. The information presentation device according to claim 6, wherein the predetermined frequency band includes a natural frequency of torsional vibration of one or more tires of the vehicle.

* * * * *